US012780374B2

(12) United States Patent
Millenaar et al.

(10) Patent No.: US 12,780,374 B2
(45) Date of Patent: Nov. 3, 2026

(54) REMOVABLE READING GLASSES FOR A DIVING MASK OR GOGGLES

(71) Applicant: SEEDEEP B.V., Gouda (NL)

(72) Inventors: Bastiaan Millenaar, Leiden (NL); Jose Paul Groeneveld, Leiden (NL)

(73) Assignee: SEEDEEP B.V., Gouda (NL)

( * ) Notice: Subject to any disclaimer, the term of this patent is extended or adjusted under 35 U.S.C. 154(b) by 526 days.

(21) Appl. No.: 18/007,228

(22) PCT Filed: Jun. 24, 2021

(86) PCT No.: PCT/NL2021/050401

§ 371 (c)(1),
(2) Date: Jan. 27, 2023

(87) PCT Pub. No.: WO2022/025754

PCT Pub. Date: Feb. 3, 2022

(65) Prior Publication Data

US 2023/0286625 A1 Sep. 14, 2023

(30) Foreign Application Priority Data

Jul. 29, 2020 (NL) ..................................... 2026159

(51) Int. Cl.
*G02C 7/08* (2006.01)
*B63C 11/12* (2006.01)

(52) U.S. Cl.
CPC .............. *B63C 11/12* (2013.01); *G02C 7/086* (2013.01)

(58) Field of Classification Search
CPC ........... B63C 11/12; G02C 7/086; G02C 7/02; G02C 7/08
USPC ........................................................... 351/57
See application file for complete search history.

(56) References Cited

U.S. PATENT DOCUMENTS

| | | | | | |
|---|---|---|---|---|---|
| 5,153,619 | A | | 10/1992 | Nix | |
| 5,564,132 | A | * | 10/1996 | Kuo | B63C 11/12 2/430 |
| 5,907,384 | A | * | 5/1999 | Kirsch | G02C 7/086 351/48 |
| 6,027,214 | A | * | 2/2000 | Graham | G02C 7/086 351/41 |
| 6,196,678 | B1 | * | 3/2001 | Chapin, III | G02C 11/12 351/44 |
| 6,244,705 | B1 | * | 6/2001 | Ledbetter | G02C 9/00 351/41 |
| 6,494,572 | B1 | * | 12/2002 | Sinoway | G02C 7/086 351/57 |

(Continued)

FOREIGN PATENT DOCUMENTS

| | | | | | |
|---|---|---|---|---|---|
| CA | 2266181 | A1 | * | 9/2000 | G02C 7/086 |
| EP | 2529798 | A1 | | 12/2012 | |
| WO | 2002058796 | A2 | | 8/2002 | |

OTHER PUBLICATIONS

International Search Report and Written Opinion for PCT Application No. PCT/NL2021/050401 dated Oct. 6, 2021, 12 pages.

*Primary Examiner* — Mustak Choudhury
(74) *Attorney, Agent, or Firm* — AEON Law, PLLC; Adam L.K. Philipp; Charlotte E. Holoubek

(57) ABSTRACT

Removable reading glasses for a diving mask or goggles. These may be used for instance when diving under water, such as when scuba diving, when swimming under water, or when performing tasks under water. They are especially suited for people requiring optical support for reading and the like.

18 Claims, 7 Drawing Sheets

(56) References Cited

U.S. PATENT DOCUMENTS

| | | | | |
|---|---|---|---|---|
| 6,719,424 | B1 * | 4/2004 | Shin | G02C 7/086<br>351/57 |
| 8,845,093 | B1 * | 9/2014 | Shieh | B63C 11/12<br>2/441 |
| 2005/0018129 | A1 * | 1/2005 | Smith | G02C 9/04<br>351/56 |
| 2006/0268220 | A1 * | 11/2006 | Hogan | G02B 25/004<br>351/47 |
| 2012/0081655 | A1 | 4/2012 | Nolan | |
| 2013/0107197 | A1 | 5/2013 | Forgan | |
| 2016/0062149 | A1 * | 3/2016 | Gerton | B63C 11/12<br>351/43 |
| 2016/0327810 | A1 * | 11/2016 | Cross | B63C 11/12 |
| 2017/0021901 | A1 * | 1/2017 | Phillipp, Jr. | G02C 9/00 |
| 2021/0271111 | A1 * | 9/2021 | Calvin | G02B 1/041 |

* cited by examiner

Fig. 5a
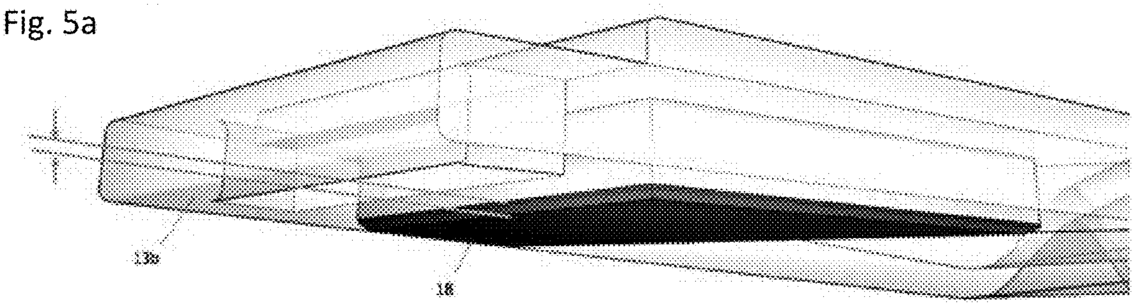
Fig. 5b
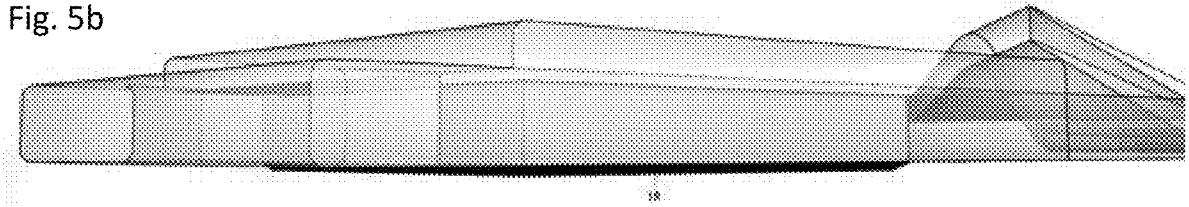
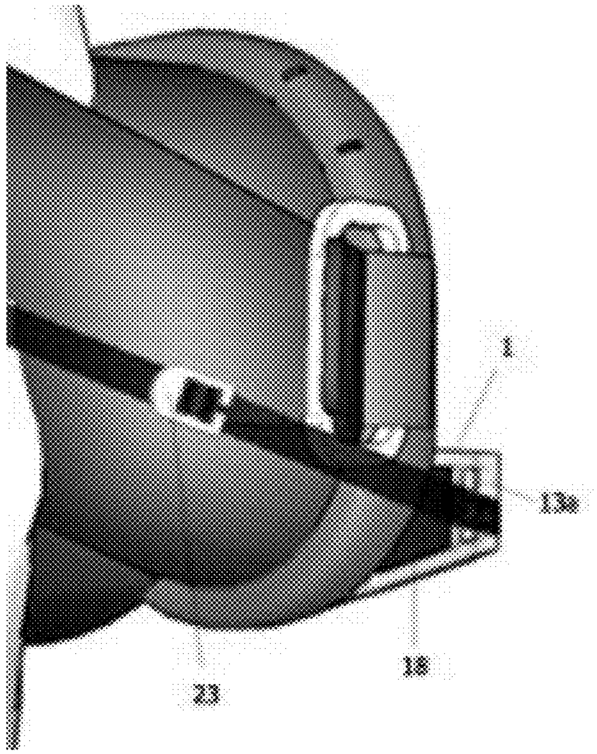
Fig. 6a

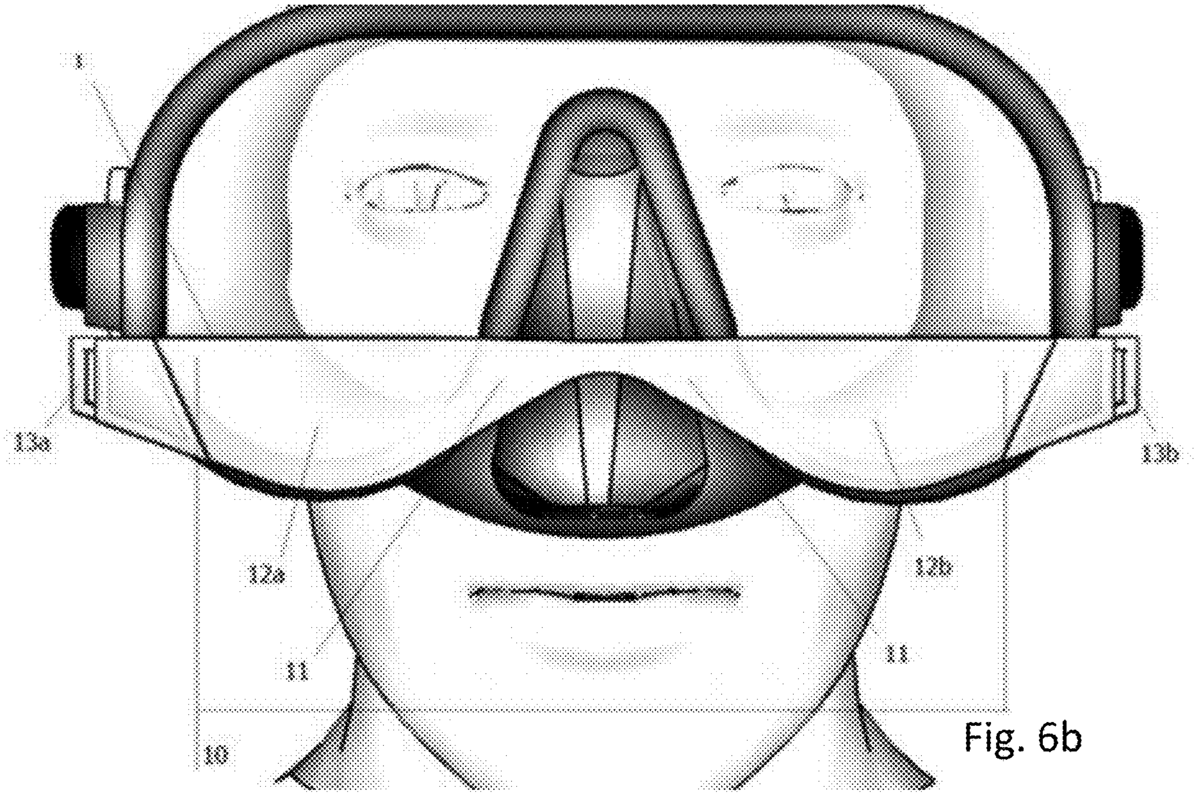
Fig. 6b
Fig.7
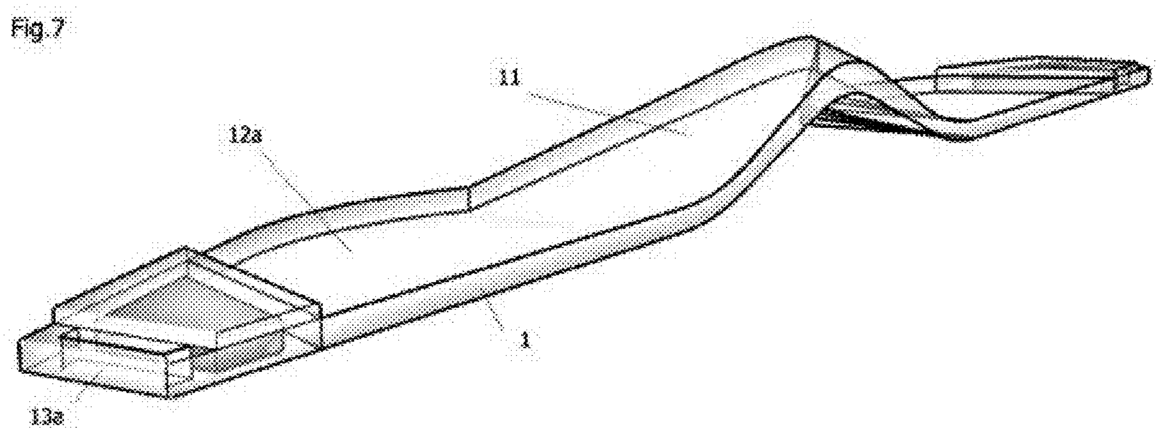

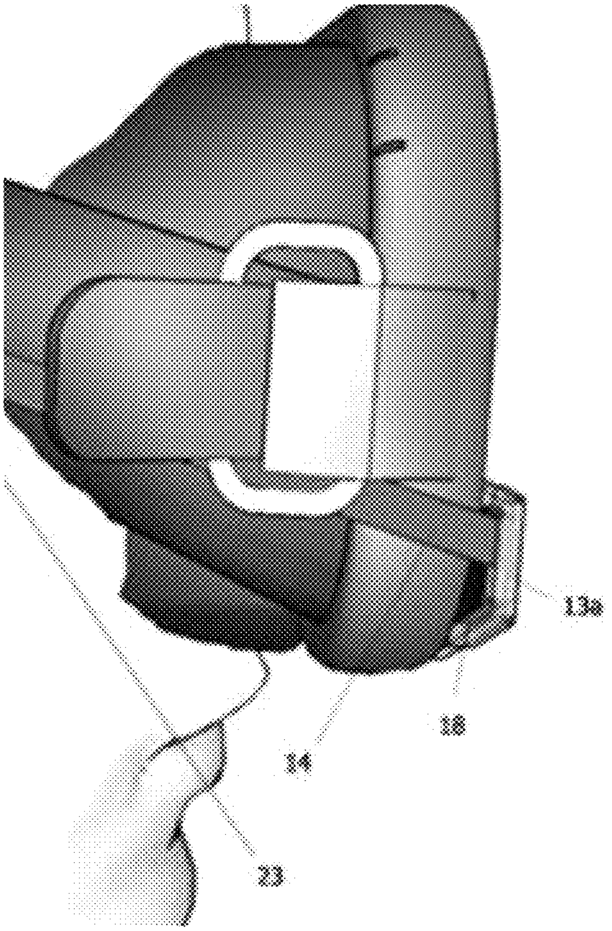
Fig. 8a
Fig. 8b
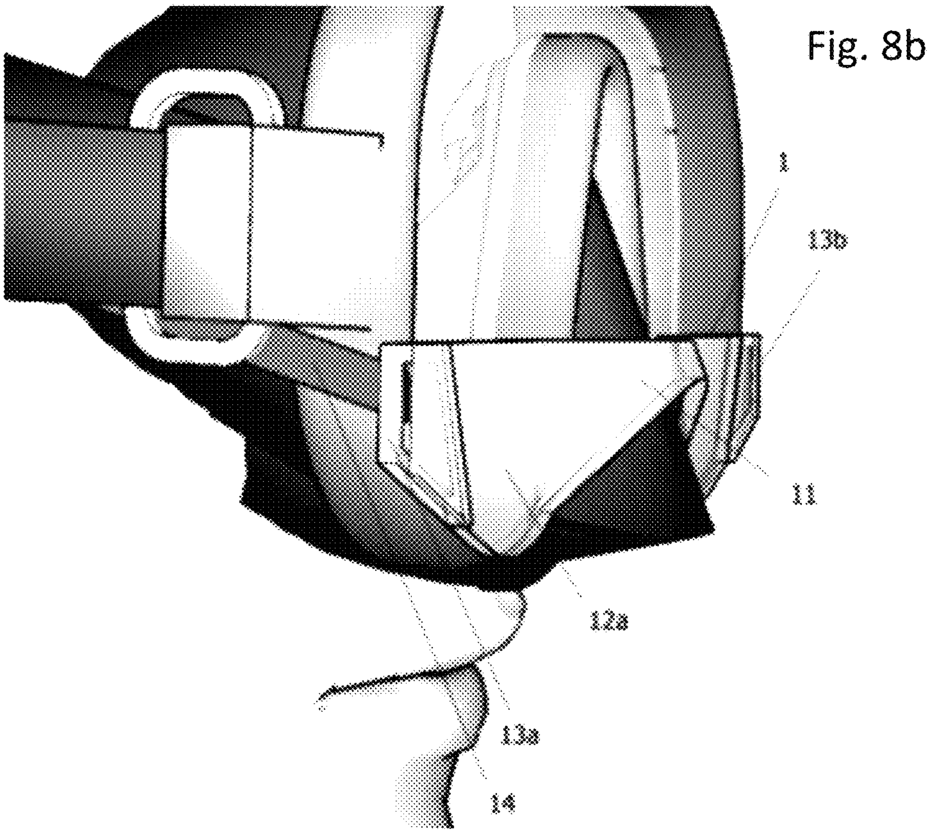

REMOVABLE READING GLASSES FOR A DIVING MASK OR GOGGLES

RELATED APPLICATIONS

This application is a national phase entry of PCT international phase patent application No. PCT/NL2021/050401, filed Jun. 24, 2021, which claims the benefit of priority of Dutch Patent Application No. 2026159, filed Jul. 29, 2020. The entire contents of the above-referenced applications and of all priority documents referenced in the Application Data Sheet filed herewith are hereby incorporated by reference for all purposes.

FIELD OF THE INVENTION

The present invention is in the field of a removable reading glasses for a diving mask or goggles. These may be used for instance when diving under water, such as when scuba diving, when swimming under water, or when performing tasks under water. They are especially suited for people requiring optical support for reading and the like.

BACKGROUND OF THE INVENTION

Scuba diving is a mode of underwater diving where the diver uses a self-contained underwater breathing apparatus, hence scuba, which is completely independent of surface supply, to breathe underwater. So scuba divers carry their own source of breathing gas, usually compressed air, allowing them greater independence and freedom of movement than surface-supplied divers, and longer underwater endurance than breath-hold divers. When diving, or when swimming under water, or performing tasks under water a diver typically wears a diving mask or goggles. The diving mask encloses the nose section of a diver. The diving mask and googles typically comprise one or two symmetrical optical viewing windows for looking through.

Existing conventional dive masks are considered not to meet the different visual requirements of users who wear glasses. A conventional diving mask typically consists of the following components, a facepiece or "skirt" usually made of silicone with or without a frame, a nose bridge, which is part of the facepiece, two glasses or a single continuous glass, which is also called mono glass, and a band or "strap", which keeps the mask on the head. Dive masks as indicated above typically are found in two types, the so-called "framed" and "Frameless" dive masks; both framed and frameless dive masks can have two glasses or a single continuous glass/mono glass. For framed masks the facepiece is attached to a plastic frame and for frameless masks the glasses are attached directly to the facepiece. The main differences between the two types of diving masks are the air volume in the diving masks and the distance between the glasses and the eyes. Framed diving masks have a large air volume and the lenses are relatively far from the eyes, in front of the nasal bridge this means that they protrude relatively little compared to the lenses.

Frameless diving masks have a small air volume and the glasses are relatively close to the eyes, in front of the nose bridge this means that it protrudes relatively far from the glasses. As the lenses of frameless diving masks are closer to the face, they create a significantly wider field of vision and therefore a superior vision. Frameless diving masks are—due to the small air volume—quicker to get rid of water when they are flooded by leakage or mask change underwater, they also give—due to the small air volume—less pressure on the face, an uncomfortable problem known among divers as "mask squeeze". Only framed dive masks with two lenses can be fitted with lenses or prescription lenses. The whole glass can be made to the strength for people wearing glasses or only the lower part of the glass for people who only need reading glasses. It is considered not possible to provide framed diving masks with one continuous glass/mono glass with ground lenses.

Existing solutions typically involve a high price, no adjustment of the visual field possible, difficult to use under water, difficult to apply, difficult to find, limited view field, obstruction of existing view field, release under water, limiting other typically functionality such as removal of a diving mask, no after treatment of the mask when in use, such as to remove condense, no clear view above the head, limited to typically a framed mask, and no possibility to exchange visual aids under water.

As water has a higher refractive index than air light entering the cornea from water is hardly refracted at all, leaving only the eye's lens to focus light. This leads to very severe hypermetropia. People with severe myopia, therefore, can see better underwater without a mask than normal-sighted people. Diving masks. Goggles, and helmets solve this problem by providing an air space in front of the diver's eyes. The refraction error created by the water is mostly corrected as the light travels from water to air through a flat lens, except that objects appear approximately 34% bigger and 25% closer in water than they actually are. The faceplate of the mask is supported by a frame and skirt, which are opaque or translucent, therefore total field-of-view is significantly reduced and eye-hand coordination must be adjusted.

Persons wearing reading glasses have limited choices for diving masks to see underwater objects sharply—from close-up—during (SCUBA) diving. Some of the objects you want to be able to see sharply underwater are e.g.:

- The dive computer on which you must be able to read crucial information about the course of the dive,
- The pressure gauge and depth gauge from which the remaining pressure and depth can be read,
- The compass to navigate underwater,
- Control buttons of photo or movie camera and the ability to see the digital screens sharply,
- Being able to see clearly small emergency repairs to the diving equipment,
- Being able to see sharply the smaller species of underwater flora and fauna.

Divers who need corrective lenses to see clearly outside the water would normally need the same prescription while wearing a mask. Generic corrective lenses are available off the shelf for some two-window masks, and custom lenses can be bonded onto masks that have a single front window or two windows. The available solutions each have some disadvantages. Some examples hereof are a conventional diving mask with frame and two glasses, a conventional diving mask with a single continuous glass or mono glass, a conventional diving mask with frame and short protruding nose bridge, a conventional dive mask without frame and far protruding nose bridge, a conventional framed diving mask with two glasses in which the reading lenses are glued or grinded into the glasses at the bottom, a conventional diving mask with a panoramic field of view, and a full face mask.

Some documents mention lenses for diving masks. For instance, U.S. Pat. No. 8,845,093 B1 recites a corrective lens for diving masks. The corrective lens for diving masks includes a corrective lens body locked on a frame of a diving mask by a locking part. Thus the corrective lens body is stacked over a surface on one side of the lens of the diving mask for improving users' vision. Moreover, the corrective lens body can be rotated horizontally in relative to the surface of the lens of the diving mask for position adjustment and vision correction. Thus the corrective lens for diving masks features on simple structure and convenience of use. US 2016/062149 A1 recites a device for adjusting underwater viewing. The device comprises a shaped lens consisting of a thin, transparent, tinted material. The shaped lens is an additive colour filter configured to add missing wavelengths to light propagating through the shaped lens, the missing wavelengths being within a range of 577 nm to 750 nm. The shaped lens is configured to be removably secured to the visor of a diving mask. The device may further comprise one or more suction cups, one or more clips, or a strap disposed through openings in the lens. The device may further comprise a means for attaching the lens to the visor of a diving mask. U.S. Pat. No. 6,244,705 B1 recites an auxiliary "task-distance" eyeglasses for use with conventional corrective eyeglasses to eliminate the constant head tilting otherwise necessary to maintain focus when using only the conventional lenses. The auxiliary glasses have upper partial lenses that correct mid-range vision, the focal length required for viewing a computer screen, reading plano music, viewing an instrument panel, or any other arms' length task. The zone of mid-range correction extends across the full width of the lenses. The lenses of the auxiliary glasses are connected by a bridge and supported on the primary glasses by two short tabs that extend sidewards so as to rest on the temple members of the primary glasses. No clips or clamps are involved, so the auxiliary glasses simply "drop in" behind the regular glasses, avoiding damage to either the primary or the auxiliary lenses. This configuration makes the auxiliary glasses less obtrusive than conventional clip-on lenses. Moreover, the auxiliary glasses can be formed inexpensively in one piece of moulded plastic, and can be sold without a prescription. And CA 2 266 181 A1 recites secondary eyeglasses which are intended for attachment to a pair of primary eyeglasses. The secondary eyeglasses include a campanulate lens mounting strip having an arch-like upper portion, two outwardly extending lower leg portions, an upper surface and a lower surface. Hooks are provided on the upper portion for detachably securing the lens mounting strip to a nose bridge of a pair of primary eyeglasses. Hooks are provided on each of the lower leg portions for detachably securing the lens mounting strip to a frame front of a pair of primary eyeglasses. Secondary lenses are positioned on the upper surface of each of the lower leg portions of the lens mounting strip.

The present invention therefore relates to an improved removable reading glasses for a diving mask or goggles, which solves one or more of the above problems and drawbacks of the prior art, providing reliable results, without jeopardizing functionality and advantages.

SUMMARY OF THE INVENTION

It is an object of the invention to overcome one or more limitations of the optical aids for diving masks or goggles of the prior art and to improve these. The present removable reading glasses 1 comprises a one piece optical element (10), the optical element comprising a curved nose section (11) adapted to bridge a nose section of the diving mask or goggles, two optic elements (12*a,b*) at each side of the nose section functioning as a lens, and at each side a fastening section (13*a,b*) for receiving a fastener, in particular a fastening section (13*a,b*) at each side opposite of the curved nose section directed to the respective left and right temple of a user. The fastening section, which may be a mounting end of the removable reading glasses, may have a mounting part for working together with a complementary mounting part. The invention, as defined in the claims, i.e. the reading glasses, is the solution to the technical problem of making suitable all types of conventional diving masks as such, unchanged, for use by eyeglass wearers. The reading glasses can be worn on all types of diving masks and can also be used on some types of glasses used when grinding, medical safety glasses and ski glasses. The reading glasses can also be put on and off underwater and is adjustable in height. The present reading glasses are widely applicable and adaptable reading glasses for a diving mask or goggles, which can be used over the full field of vision of the diver The reading glasses of the present invention make this possible. In an example the reading glasses (see FIGS. 1 and 2) comprise a frame, an optionally reinforced nose bridge part of the frame, two lenses, and an elastic band. The contact surfaces at both ends on the underside of the frame provide adhesion between the diving mask and the reading glasses. The adhesion keeps the reading glasses in the chosen position and counter balances the tension in any direction caused by the elastic band. The present reading glasses are specially designed to cover only a part, such as a lower part, of the field of vision when in use with masks (see FIGS. 2 and 3) such as conventional diving masks. In this way, a bifocal effect is achieved, making it possible for the wearer to read instruments properly during use and to see objects close by sharply. The part of the field of vision of a conventional diving mask for looking straight ahead is thus not obstructed by the reading glasses according to the invention. The contact surfaces with optionally increased adhesion achieved by applying e.g. soft silicone surfaces (see drawing 4*a* and 4*b*) in trenches/recesses at both ends on the inside of the frame of the reading glasses. The soft silicone surfaces can be glued, snapped or recessed into a recess in the frame, the thickness of the soft silicone surfaces is then greater than the depth of the recesses, so that the surfaces protrude above the surface of the frame of the spectacles (see drawings 5*a* and 5*b*).

The adhesion surfaces only or mainly make contact with the edge of the goggles (see drawings 6*a* and 6*b*), as the edge of a conventional goggles with or without frame protrudes about 1 to 3 mm above the glass or glasses of the diving mask. The glass or glasses are therefore 1 to 3 mm deeper than the edge of the mask. This is different for conventional diving masks with a panoramic field of view, as the edges on the side of such a mask are missing. For such diving masks, the contact surfaces make contact with the continuous glass of such goggles. The contact surfaces will also on this type of mask ensure that the reading glasses remain in the desired position. The contact surfaces with increased adhesion can also relate to other materials, which increase the adhesion between the frame of the goggles and the mask, than the soft silicone mentioned above. The shape of the highly adhesive surfaces is found not essential, but they are preferably as large as possible, so that on each type/shape of diving mask the surfaces make optimal contact with the edge of the diving mask and without reducing the field of view of the diving mask too much.

A reinforced nose bridge (drawing 7) is especially used for bridging a greater distance compared to regular reading glasses. In addition to the greater distance between the lenses, the (far) protruding flexible nose bridges of both framed and frameless diving masks are typically also bridged. In addition, the nose bridge is strong enough to withstand the rearward force/strain of the headband (see drawings 8*a* and 8*b*) and to prevent the reading glasses from bending at the nose bridge (see drawing 9).

The nose bridge of the reading glasses and the two contact surfaces of the reading glasses prevent the reading glasses from shifting after placing the reading glasses on the conventional diving mask. Although one of the contact surfaces mentioned above may also be present for the stabilization of the invention. In the presence of nose bridge and both contact surfaces, the stabilization of the present glasses is therewith further increased. Movement of the reading glasses caused by the tension of the elastic headband is thus prevented. Furthermore, the contact surfaces make it possible to fix at any desired height on the diving mask (see drawing 10) without the reading glasses shifting during use. It is important that the reading glasses can also be placed higher up on the diving mask if a user wants to be able to sharply see objects that are above the head (drawing 11), because of the three-dimensional freedom of movement underwater it often happens that objects are also above the head, e.g. under reefs, in wrecks or in caves.

The reading glasses can be put on or off during the dive without any special preparation or assembly operations by placing them in front of the diving mask and pulling the elastic headband (see drawings 8*a* and 8*b*). The elastic headband of the reading glasses worn should preferably be on the side of the mask. The reading glasses are worn on the outside of the mask.

The characteristics of the parts of the reading glasses for a preferred version are for instance:

A frame (see drawings 1, 2 and 4*a*) that has a top, two sides and a bottom and is three-dimensional in shape.

The shape of the top (see drawings 7 and 12) when worn on goggles runs either horizontally or approximately horizontally, with the part of the top formed by the nasal bridge approximately following the contours of the nosepiece of the diving mask.

This top (see drawings 7 and 12) has two almost straight sections where the reading glasses touch the edge or frame or glass of the mask and a curve where the reading glasses approximately follow the contours of the nosepiece of the mask.

The shape of the sides (see drawings 1, 6*a*, 6*b*, 8*b* and 9) can be chosen free as long as it is possible to attach an elastic head strap to both ends of the reading glasses and will usually run straight and vertical when the reading glasses are on the diving mask.

The shape of the underside of the reading glasses can be chosen free, but will preferably follow more or less the shape of the underside of the mask as clearly shown in drawing 6*a*, which shows the reading glasses worn at the lowest possible position on a conventional diving mask.

The reading glasses have a three-dimensional structure due to the fact that the nasal bridge approximately follows the contours of the nosepiece of the mask.

The height of the nose bridge of the reading glasses is determined by the lowest position of the reading glasses on a frameless mask. At this extreme position, the nose bridge may just make contact with the nosepiece of the mask. As a result, it is ensured that the frame of the reading glasses is in any other elevated position on the diving mask close to the front of the diving mask. The frame of the reading glasses will otherwise be parallel to the frame/front of the mask. As a result, the glasses of the reading glasses in each wearing position are as parallel as possible to the glass or glasses of the diving mask. The distance between the frame of the reading glasses and the glasses of the mask is preferably between 2 mm and 4 mm.

The width of the nose bridge at the bottom or base for both frameless and framed dive masks gradually increases towards the eyes towards the mouth. The nose bridge of the reading glasses therefore always has a certain lateral play in relation to the nosepiece of the mask to ensure that the lenses of the reading glasses are almost parallel to the glass or lenses of the mask. With a frameless mask there is usually little lateral play, but with a frameless mask the lateral play can be 0 to 20 mm to about 10 mm. The nose bridge of the reading glasses helps to correctly position/attach the reading glasses to the mask. The nose bridge is so stiff that it is not or negligibly deformed by the rearward-facing force/strain caused by the headband.

The glasses of the reading glasses are preferably permanently placed in the frame of the reading glasses and therefore normally not interchangeable; however exchange of glasses/lenses also is an option. The required strength of the lenses for a spectacle wearer can easily be determined by a professional, for example, by routinely trying out lenses of different strength in the reading glasses of the invention and taking into account the strength of the lenses of the reading glasses used by the wearer in everyday life.

The selection of the material for the glasses corresponds to the material of the glasses used for conventional diving goggles such as glass, plastic, plexiglass, polycarbonate, polyacrylate, or safety glass and similar plastics, but is preferably polycarbonate.

Exemplary dimensions of the various parts of the reading glasses, as shown below, are not critical and should be seen as guidelines for making the reading glasses according to the invention.

The thickness of the flat part of the reading goggles lying against the front of the goggles is preferably 1 to 10 mm.

The thickness of the nose bridge of the reading glasses is chosen in such a way that the nose bridge is sufficiently stiff so that it does not deform during the putting on and wearing of the reading glasses and is therefore between 1 and 10 mm, such as between 3-4 mm.

The total width of the reading glasses is approximately 170 to 180 mm for reading glasses for standard adult faces.

The height of the sides is preferably 10-20 mm, such as 12-13 mm.

The height of the glasses in the frame of the reading glasses is 20-35 mm, such as 23-26 mm and the width of the glasses is 40-60 mm, such as 45-55 mm, e.g. 50 mm.

The shape of the lenses is not essential as long as the field of vision is large enough for reading instruments and allows objects close up to be seen sharply.

In an exemplary embodiment a top side of the present reading glasses is substantially straight, and when worn upright is in a horizontal position.

It may be preferred that the reading glasses are adapted to a profile of a frame or contour of a diving mask, such as at a bottom side and/or at a top side thereof.

The shape is preferably chosen as shown in FIG. 6*b*, in which the top and bottom of the lenses approximate the contours of a conventional diving mask.

Advantages of the present description are detailed throughout the description.

DETAILED DESCRIPTION OF THE INVENTION

In an exemplary embodiment of the present removable reading glasses each optical element individually provides a positive or negative lens function, such as from +7 dioptre to −7 dioptre.

In an exemplary embodiment of the present removable reading glasses the inner surfaces of optic elements (12*a,b*) are substantially flat.

In an exemplary embodiment the present removable reading glasses comprises a flexible fastener (14) for attaching to a head of a user, such as an elastic fastener, such as an elastic strap.

In an exemplary embodiment of the present removable reading glasses the curved nose section is more flexible than the remainder of the reading glasses.

In an exemplary embodiment of the present removable reading glasses the curved nose section comprises a resilient element (15), such as a metal element, such as a metal strip or metal bar.

In an exemplary embodiment of the present removable reading glasses the one piece optical element is made of an optically transparent polymer, such as polycarbonate, poly acrylate, or a combination thereof.

In an exemplary embodiment of the present removable reading glasses the one piece optical element is a cast element.

In an exemplary embodiment of the present removable reading glasses the fastening section (13*a,b*) each individually comprises a friction piece (18), such as a silicone friction piece, and a metal friction pieced, such as of Al, the friction piece preventing the removable reading glasses in use from shifting over the diving mask or goggles due to the tension/force caused by the elastic band, wherein optionally the fastening section comprises a removably attachable closure (23).

In an exemplary embodiment of the present removable reading glasses the attachment means, such as a band or strap, are configured to allow attachment of the optical structure to the head of the user even if the ears of the user are covered; in other words also with a head cap on the present removable reading glasses can be used.

In an exemplary embodiment the present removable reading glasses comprise a reinforced edge, such as reinforced with a metal strip or wire. Therewith also the mask of the mask is increased.

In an exemplary embodiment of the present removable reading glasses each optical element (12*a,b*) comprises an engagement surface (19) for engaging an outer surface (20) of the goggles/diving mask, which surface may also be considered as a contact surface, or friction surface, providing typically an increased friction.

In an exemplary embodiment of the present removable reading glasses the engagement surface(s) are substantially flat.

In an exemplary embodiment of the present removable reading glasses the engagement surface(s) protrude from the optical structure.

In an exemplary embodiment of the present removable reading glasses the engagement surfaces(s) are made of a material that provides friction between the engagement surfaces and the goggles, when in use.

In an exemplary embodiment of the present removable reading glasses the engagement surface(s) are provided at opposite ends of the reading glasses.

In an exemplary embodiment of the present removable reading glasses engagement surfaces are provided along two or more edges of the reading glasses.

In an exemplary embodiment of the present removable reading glasses engagement surfaces have a surface area of 1-16 $cm^2$, preferably 1.5-10 $cm^2$, more preferably 2-8 $cm^2$, such as 4-6 $cm^2$. The contact surfaces are as large as possible so that on each type of diving mask or snorkel mask the surfaces make optimum contact with the diving mask or snorkel mask, but without disturbing the field of view of the diving mask or snorkel mask.

In an exemplary embodiment the present removable reading glasses comprises recesses (21) in which engagement means (22) are situated, such as a block fitting in the recesses, typically with a height slightly higher than that of the recesses, the engagement means being provided with the engagement surfaces.

In an exemplary embodiment of the present removable reading glasses the engagement means provide friction, such as silicone, or metal.

In an exemplary embodiment of the present removable reading glasses a height of the optic elements (12*a,b*) is from 1-5 cm, preferably 2-3 cm.

In an exemplary embodiment of the present removable reading glasses a thickness of the reading glasses varies between 3-15 mm, preferably 4-10 mm, more preferably 5-8 mm.

In an exemplary embodiment of the present removable reading glasses an upper part of the reading glasses is substantially straight.

In an exemplary embodiment of the present removable reading glasses an lower part of the reading glasses is curved, and/or In an exemplary embodiment of the present removable reading glasses a height of the curved nose section (11) is 8-30 mm, preferably 10-20 mm.

In an exemplary embodiment of the present removable reading glasses the optic elements (12*a,b*) are substantially flat.

In an exemplary embodiment of the present removable reading glasses the optic elements (12*a,b*) comprise Fresnel lenses.

In an exemplary embodiment of the present removable reading glasses a refractive index of the optic elements (12*a,b*) is between 1.25 and 1.5, preferably between 1.3 and 1.46.

In an exemplary embodiment of the present removable reading glasses the curved nose section is adapted to fit to a diving mask or goggles when used in a lowest position.

In an exemplary embodiment the present removable reading glasses comprise a protective coating, such as a coating for preventing scratching, such as a SiC coating, an AlO coating, a SiN coating, a natural or artificial rubber coating, and combinations thereof.

The invention will hereafter be further elucidated through the following examples which are exemplary and explanatory of nature and are not intended to be considered limiting of the invention. To the person skilled in the art it may be clear that many variants, being obvious or not, may be conceivable falling within the scope of protection, defined by the present claims.

SUMMARY OF THE FIGURES

FIGS. 5*a* and 5*b* show how the adhesion-increasing material applied in the recesses of the frame of the reading glasses protrudes slightly above the edges of the recesses.

FIGS. 6*a* and 6*b* show the position where the adhesion enhancing surfaces make contact with the frame of the diving mask.

FIG. 7 shows the reinforced nose bridge.

FIGS. 8*a* and 8*b* show the position of the elastic strap of the reading glasses on the diving mask.

DETAILED DESCRIPTION OF FIGURES

Figure 1:
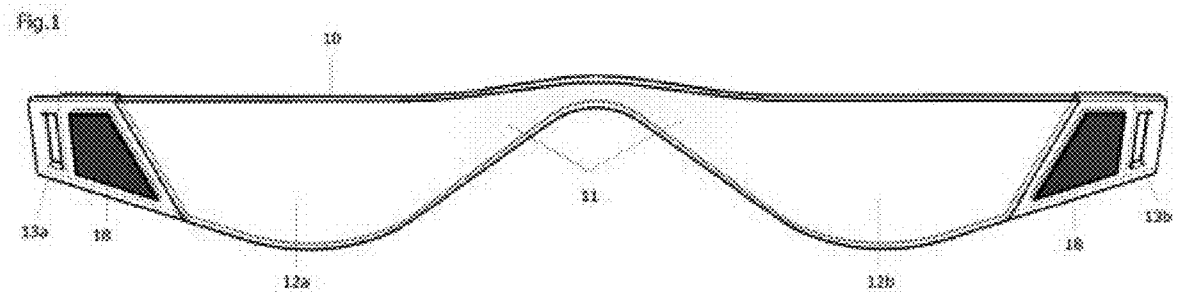
FIG. 1 shows reading glasses according to the invention.
Figure 2:
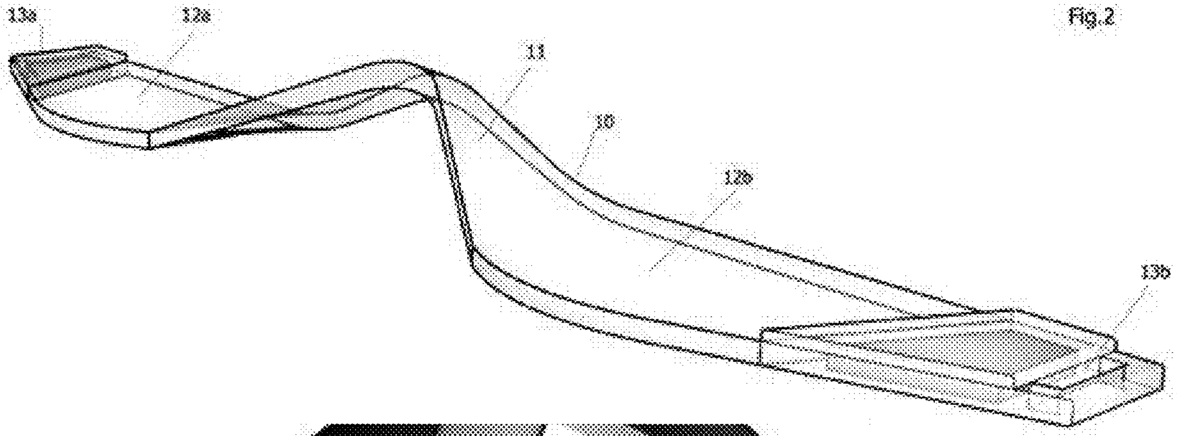
FIG. 2 shows the reading glasses in FIG. 1 at a different angle.
Figure 3A:
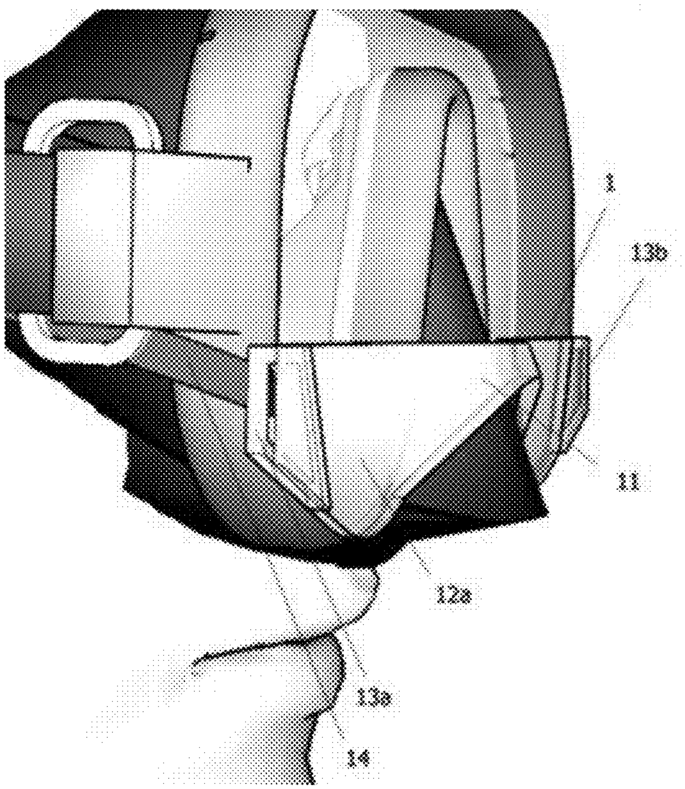
FIGS. 3*a* and 3*b* show the reading glasses worn at different heights on a conventional diving mask.
Figure 3B:
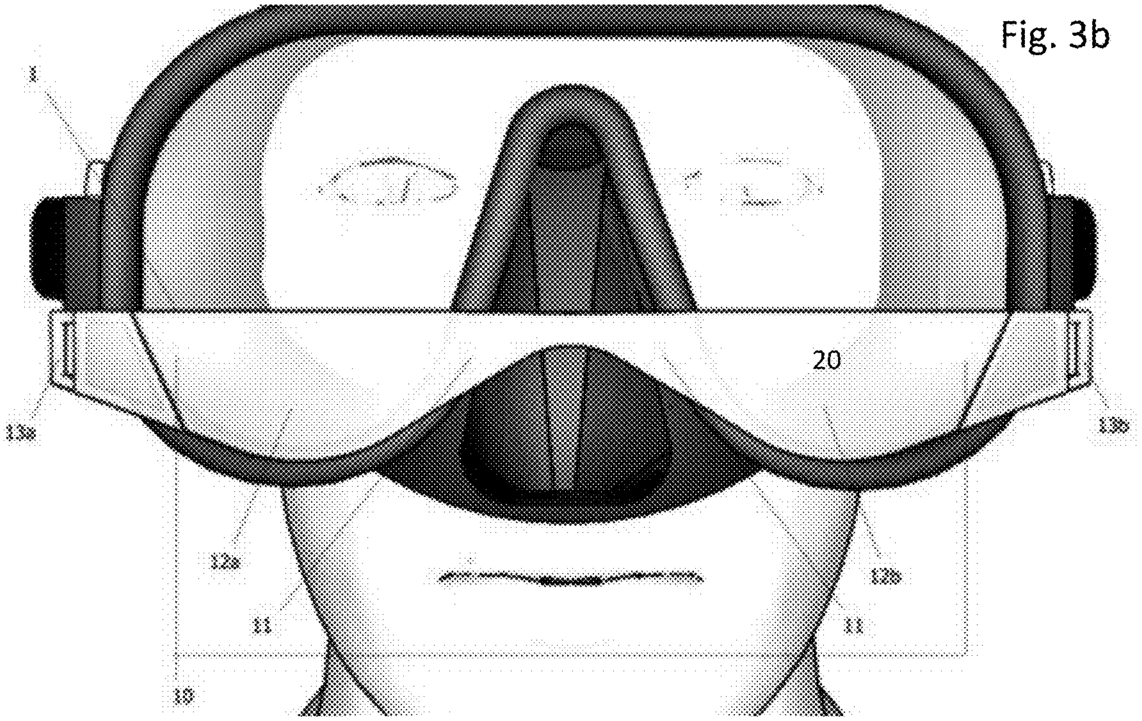
Figure 4A:
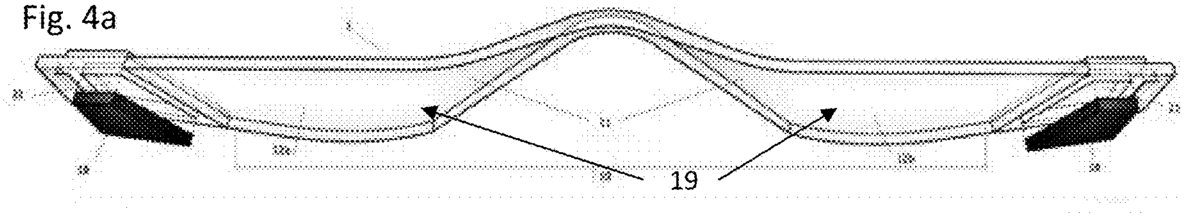
FIGS. 4*a* and 4*b* show the position of the contact surfaces with increased adhesion in the reading glasses.
Figure 4B:
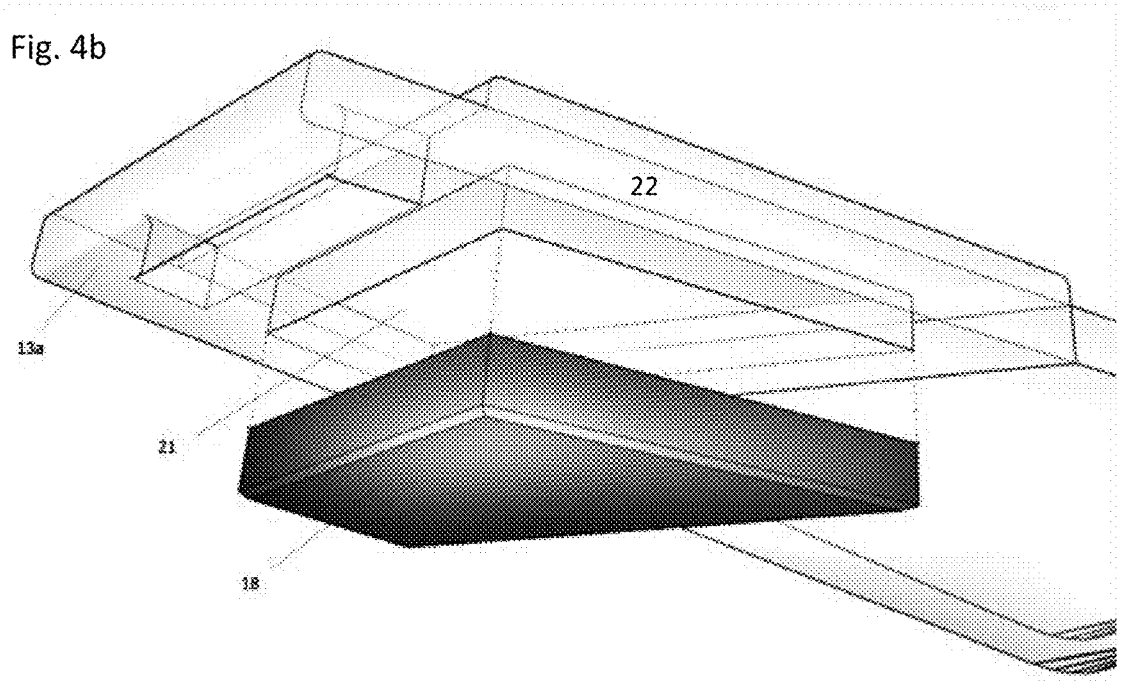
Figure 9:
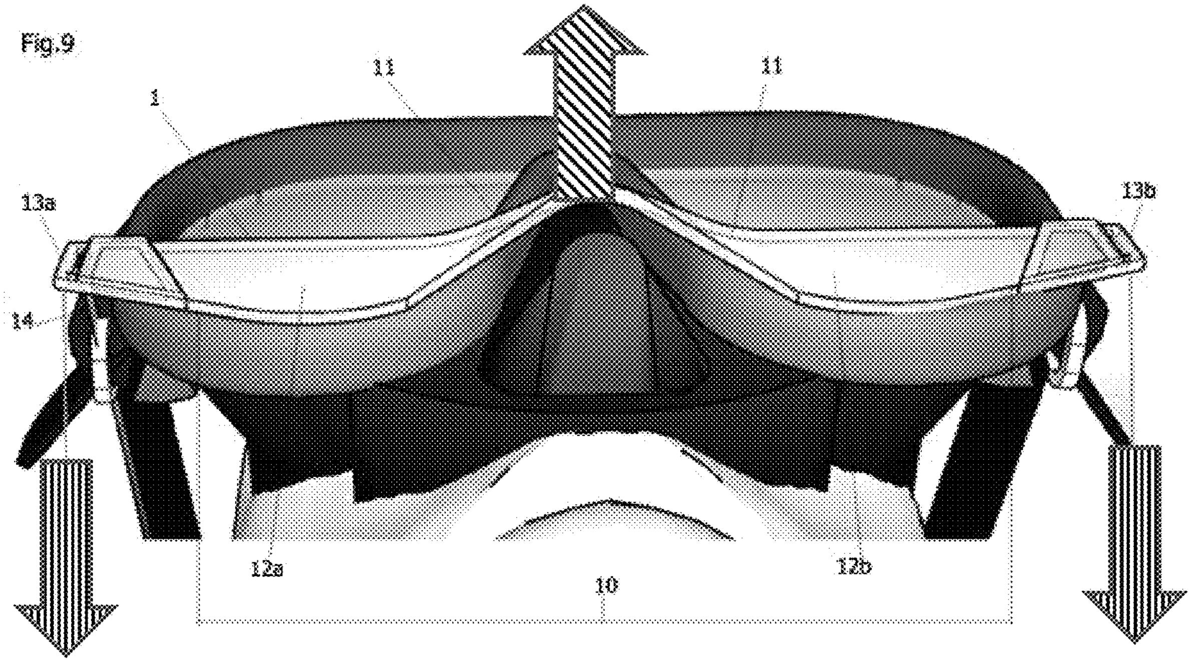
FIG. 9 shows the forces exerted on the reading glasses by the tension of the elastic headband. The upward arrow indicates bending, the downward arrows indicate a force applied.
Figure 10:
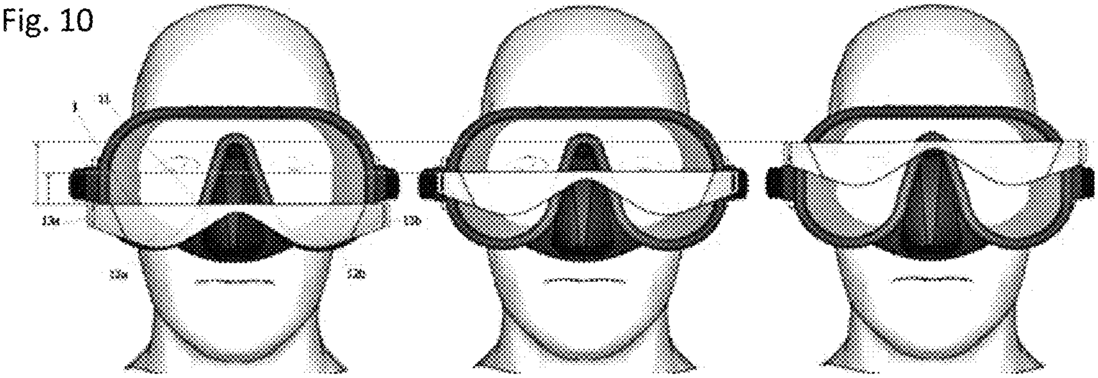
FIG. 10 shows the different positions in which the reading glasses can be placed on the diving mask.
Figure 11:
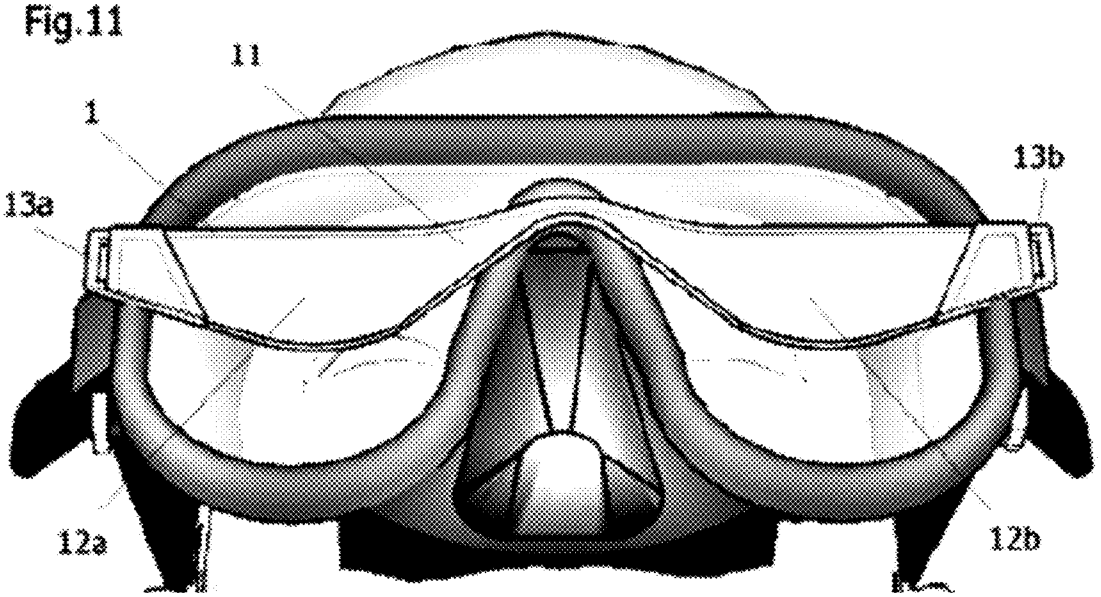
FIG. 11 shows the position of the reading glasses when an object is above the head of a diver.
Figure 12:
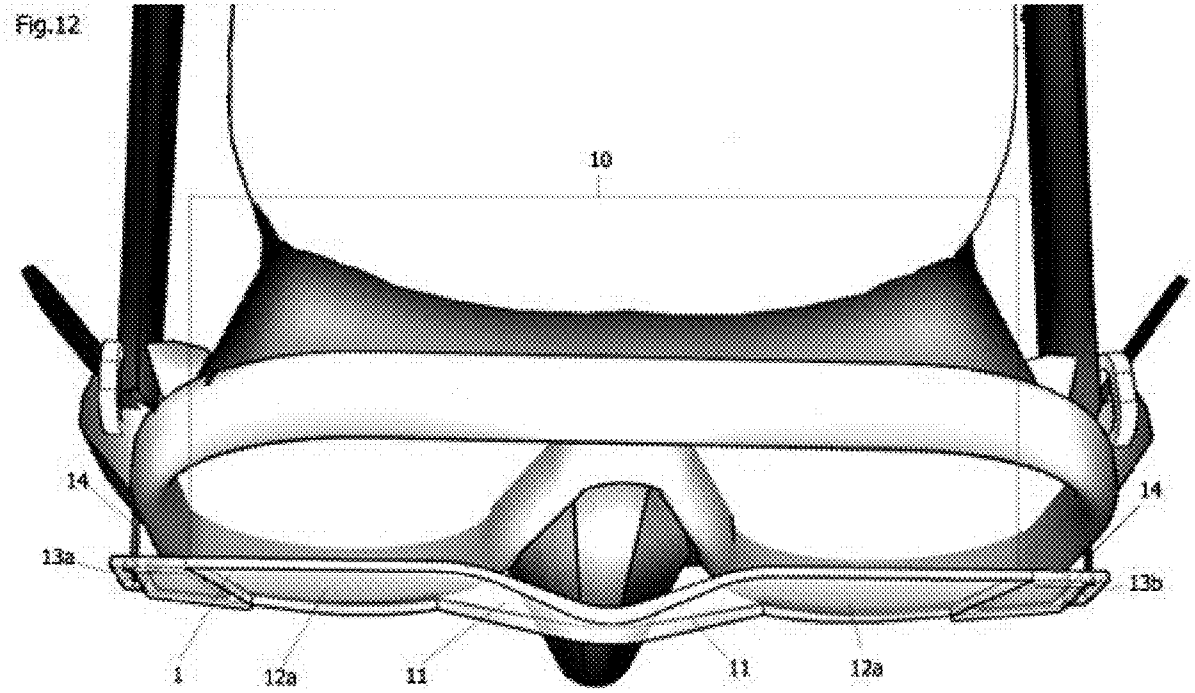
FIG. 12 shows the lenses of the reading glasses parallel to the glasses of the diving mask and the nose bridge of the reading glasses following the contours of the nose bridge of the diving mask.

In the figures:

1 Removable reading glasses
10 one piece optical element
11 curved nose section
12*a* optic element
12*b* optic element
13*a* fastening section
13*b* fastening section
14 flexible fastener
18 friction piece
19 engagement surface
20 outer surface
21 recess
22 engagement means
23 closure

The invention claimed is:

1. A removable reading glasses for a diving mask or goggles comprising a one piece optical unit, the optical unit comprising a curved nose section adapted to bridge a nose section of the diving mask or goggles, two optical elements at each side of the nose section functioning as a lens, wherein each optical element individually provides a positive or negative lens function, and the optical unit comprising at each side thereof a fastening section for receiving a fastener, in particular at the fastening section at each side opposite of the curved nose section, wherein the removable reading glasses are unitary and formed as one whole element, wherein the optical elements comprises engagement surfaces that are made of a material that provides friction between the engagement surfaces and the goggles, when in use wherein a height of the optical elements is from 1-5 cm, and wherein a thickness of the reading glasses varies between 3-15 mm, and wherein a height of the curved nose section is 8-30 mm, and wherein the optical elements are substantially flat, and wherein a refractive index of the optical elements is between 1.25 and 1.5, and wherein the curved nose section is adapted to fit to a diving mask or goggles when used in a lowest position.

2. The removable reading glasses according to claim 1, wherein the inner surfaces of optical elements are substantially flat.

3. The removable reading glasses according to claim 1, comprising a flexible fastener for attaching to a head of a user.

4. The removable reading glasses according to claim 1, wherein the curved nose section is more flexible than the remainder of the reading glasses.

5. The removable reading glasses according to claim 1, wherein the curved nose section comprises a resilient element.

6. The removable reading glasses according to claim 1, wherein the one piece optical unit is made of an optically transparent polymer.

7. The removable reading glasses according to claim 1, wherein the one piece optical unit is a cast element.

8. The removable reading glasses according to claim 1, wherein the fastening section each individually comprises a friction piece, the friction piece preventing the removable reading glasses in use from shifting over the diving mask or goggles, wherein optionally the fastening section comprises a removably attachable closure.

9. The removable reading glasses according to claim 1, wherein attachment means are configured to allow attachment of the optical structure to the head of the user, even if the ears of the user are covered.

10. The removable reading glasses according to claim 1, wherein each optical element comprises an engagement surface for engaging an outer surface of the goggles/diving mask.

11. The removable reading glasses according to claim 10, wherein the engagement surface(s) are substantially flat.

12. The removable reading glasses according to claim 10, wherein the engagement surface(s) protrude from the optical structure.

13. The removable reading glasses according to claim 10, wherein the engagement surface(s) are provided at opposite ends of the reading glasses.

14. The removable reading glasses according to claim 10, wherein engagement surfaces are provided along two or more edges of the reading glasses.

15. The removable reading glasses according to claim 10, comprising recesses in which a block is situated, the block being provided with the engagement surfaces.

16. The removable reading glasses according to claim 15, wherein the block provides friction.

17. The removable reading glasses according to claim 10,
wherein an upper part of the reading glasses is substantially straight, and
wherein an lower part of the reading glasses is curved, and
wherein the optical elements comprise Fresnel lenses, and
comprising a coating selected from a protective coating, a natural or artificial rubber coating, and combinations thereof.

18. A diving mask or goggles comprising removable reading glasses according to claim 1.

* * * * *